(12) United States Patent
Mallenahally et al.

(10) Patent No.: US 11,222,628 B2
(45) Date of Patent: Jan. 11, 2022

(54) MACHINE LEARNING BASED PRODUCT SOLUTION RECOMMENDATION

(71) Applicant: Intuit Inc., Mountain View, CA (US)

(72) Inventors: Girish Channakeshava Mallenahally, Plano, TX (US); Valentin Vrzheshch, Mountain View, CA (US); Micah G. Sampson, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 154 days.

(21) Appl. No.: 16/676,049

(22) Filed: Nov. 6, 2019

(65) Prior Publication Data

US 2021/0134279 A1 May 6, 2021

(51) Int. Cl.

| | |
|---|---|
| *G10L 17/00* | (2013.01) |
| *G10L 15/18* | (2013.01) |
| *G10L 15/16* | (2006.01) |
| *G06N 20/00* | (2019.01) |
| *G10L 15/04* | (2013.01) |
| *G06F 40/205* | (2020.01) |
| *G06F 40/284* | (2020.01) |
| *G10L 15/26* | (2006.01) |

(52) U.S. Cl.
CPC ........ *G10L 15/1822* (2013.01); *G06F 40/205* (2020.01); *G06F 40/284* (2020.01); *G06N 20/00* (2019.01); *G10L 15/04* (2013.01); *G10L 15/16* (2013.01); *G10L 15/26* (2013.01)

(58) Field of Classification Search
CPC .......... G06N 20/00; G06N 7/005; G06N 5/02; G06N 3/006; G06N 5/04; G10L 15/22; G10L 25/63; G10L 2015/227; G10L 15/1815; G10L 15/26; G10L 17/06; G10L 17/22; G06F 40/35; G06F 40/30; G06F 16/00; G06F 16/3322

See application file for complete search history.

(56) References Cited

U.S. PATENT DOCUMENTS

| | | | | |
|---|---|---|---|---|
| 6,029,195 | A * | 2/2000 | Herz | G06Q 30/02 |
| | | | | 725/116 |
| 2017/0017635 | A1* | 1/2017 | Leliwa | G06F 40/258 |
| 2018/0053119 | A1* | 2/2018 | Zeng | G06F 40/295 |
| 2018/0276723 | A1* | 9/2018 | Kannan | H04L 51/34 |
| 2018/0314958 | A1* | 11/2018 | Sethi | G06Q 10/20 |
| 2019/0362021 | A1* | 11/2019 | Balduino | G06F 40/30 |
| 2020/0005118 | A1* | 1/2020 | Chen | G06N 3/006 |
| 2020/0007380 | A1* | 1/2020 | Chen | H04L 41/046 |

(Continued)

*Primary Examiner* — Olujimi A Adesanya
(74) *Attorney, Agent, or Firm* — Paradice and Li LLP

(57) ABSTRACT

Aspects of the disclosure describe improving identification of product solutions. An example method includes transcribing in real-time a conversation between a user and an agent into a speech text, processing digital data of the speech text associated with a topic, including parsing the speech text into one or more words and determining collocation information among the one or more words in the speech text. The method also includes providing the one or more words and the collocation information as a first input set to a machine learning engine configured to recommend one or more product solutions from a library of product solutions, generating a recommendation of one or more product solutions for a user based on recommendation parameters for the library of product solutions, and providing the recommendation.

17 Claims, 5 Drawing Sheets

(56) References Cited

U.S. PATENT DOCUMENTS

| | | | |
|---|---|---|---|
| 2020/0065857 A1* | 2/2020 | Lagi | G06F 16/9535 |
| 2020/0177403 A1* | 6/2020 | Vazquez-Rivera | G06Q 10/10 |
| 2020/0401885 A1* | 12/2020 | Hewitt | G06F 11/3006 |
| 2021/0117777 A1* | 4/2021 | Mattarella-Micke | G06N 3/08 |

* cited by examiner

400

```
┌─────────────────────────────────────────────────────────────┐
│  Transcribing, in real-time, a conversation between a user  │
│  and an agent into a speech text. (402)                     │
└─────────────────────────────────────────────────────────────┘
                              │
                              ▼
┌─────────────────────────────────────────────────────────────┐
│  Processing digital data of the speech text associated with │
│  a topic. (404)                                             │
│  ┌───────────────────────────────────────────────────────┐  │
│  │ Parsing the speech text into one or more words. (406) │  │
│  └───────────────────────────────────────────────────────┘  │
│  ┌───────────────────────────────────────────────────────┐  │
│  │ Determining collocation information among the one or  │  │
│  │ more words in the speech text. (408)                  │  │
│  └───────────────────────────────────────────────────────┘  │
└─────────────────────────────────────────────────────────────┘
                              │
                              ▼
┌─────────────────────────────────────────────────────────────┐
│  Providing the one or more words and the collocation        │
│  information as a first input set to a machine learning     │
│  engine configured to recommend one or more product         │
│  solutions from a library of product solutions. (410)       │
└─────────────────────────────────────────────────────────────┘
                              │
                              ▼
┌─────────────────────────────────────────────────────────────┐
│  Generating a recommendation of one or more product         │
│  solutions for a user. (412)                                │
│  ┌───────────────────────────────────────────────────────┐  │
│  │ Processing the first input set based on recommendation│  │
│  │ parameters for the library of product solutions. (414)│  │
│  └───────────────────────────────────────────────────────┘  │
└─────────────────────────────────────────────────────────────┘
                              │
                              ▼
┌─────────────────────────────────────────────────────────────┐
│  Providing the recommendation. (416)                        │
│  ┌ ─ ─ ─ ─ ─ ─ ─ ─ ─ ─ ─ ─ ─ ─ ─ ─ ─ ─ ─ ─ ─ ─ ─ ─ ─ ─ ┐  │
│    Providing the recommendation to the agent. (418)         │
│  └ ─ ─ ─ ─ ─ ─ ─ ─ ─ ─ ─ ─ ─ ─ ─ ─ ─ ─ ─ ─ ─ ─ ─ ─ ─ ─ ┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ┐  │
│    Providing the recommendation to the user. (420)          │
│  └ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────┘
```

FIG. 4

MACHINE LEARNING BASED PRODUCT SOLUTION RECOMMENDATION

TECHNICAL FIELD

This disclosure relates generally to machine learning, and specifically to improving product solution recommendations based on machine learning.

DESCRIPTION OF RELATED ART

Many user products are used to improve productivity. For example, an accounting application on a user's computer allows a user to improve handling of finances for a household or small business. When a user requires assistance for a product (such as the accounting application), the user interacts with an agent for support. For example, if the user has a question implementing a payroll function in the accounting application, the user calls customer support to ask an agent how to implement the function. The application may support a plurality of plug-ins or applications that can integrate with the application, such as a plug-in to implement the payroll function. Based on the agent's conversation with the user, the agent may determine that the plug-in is useful to the user and recommend the plug-in to the user.

However, the user application can support hundreds of plug-ins and applications, and each agent may have limited knowledge base of the plug-ins and applications based on his or her experience and interactions with users. Additionally, the agent has a limited amount of time conversing with the user, which limits the amount of time to determine if a plug-in or application should be recommended to the user. As a result, different agents recommend different plug-ins or applications or make different decisions whether to recommend a plug-in or application for similar user conversations. Furthermore, an agent (relying exclusively on his or her experience) may not be aware of a specific plug-in or application that should be recommended to the user.

Accordingly, there is a need to identify, in real-time, product solutions that may be recommended to a user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

Aspects of the disclosure describe improving identification and recommendation of product solutions. An example method of identifying one or more product solutions includes transcribing, in real-time, a conversation between a user and an agent into speech text. The method also includes processing, during the conversation and using a natural language processing (NLP) model, digital data of the speech text associated with a topic. Processing the digital data of the speech text includes parsing the speech text into one or more words and determining collocation information among the one or more words in the speech text. The method also includes providing the one or more words and the collocation information as a first input set to a machine learning engine configured to recommend one or more product solutions from a library of product solutions. The method further includes generating a recommendation of one or more product solutions for a user. Generating the recommendation includes processing, using the machine learning engine, the first input set based on recommendation parameters for the library of product solutions. The method also includes providing the recommendation. The method may also include receiving feedback associated with a user engagement with the one or more product solutions after providing the recommendation and adjusting, using the machine learning engine, the recommendation parameters based on the feedback.

Another innovative aspect of the subject matter described in this disclosure can be implemented in a system. The system can include at least one or more processors and a memory. The memory stores instructions that, when executed by the one or more processors, causes the system to perform operations including transcribing, in real-time, a conversation between a user and an agent into speech text. The operations also include processing, during the conversation and using an NLP model, digital data of the speech text associated with a topic. Processing the digital data of the speech text includes parsing the speech text into one or more words and determining collocation information among the one or more words in the speech text. The operations also include providing the one or more words and the collocation information as a first input set to a machine learning engine configured to recommend one or more product solutions from a library of product solutions. The operations further include generating a recommendation of one or more product solutions for a user. Generating the recommendation includes processing, using the machine learning engine, the first input set based on recommendation parameters for the library of product solutions. The operations also include providing the recommendation. The operations may also include receiving feedback associated with a user engagement with the one or more product solutions after providing the recommendation and adjusting, using the machine learning engine, the recommendation parameters based on the feedback.

Another innovative aspect of the subject matter described in this disclosure can be implemented in a non-transitory, computer-readable medium. The computer-readable medium may store instructions that, when executed by one or more processors of an apparatus, cause the apparatus to perform operations including transcribing, in real-time, a conversation between a user and an agent into speech text. The operations also include processing, using an NLP model, digital data of the speech text associated with a topic. Processing the digital data of the speech text includes parsing the speech text into one or more words and determining collocation information among the one or more words in the speech text. The operations also include providing the one or more words and the collocation information as a first input set to a machine learning engine configured to recommend one or more product solutions from a library of product solutions. The operations further include generating a recommendation of one or more product solutions for a user. Generating the recommendation includes processing, using the machine learning engine, the first input set based on recommendation parameters for the library of product solutions. The operations also include providing the recommendation. The operations may also include receiving feedback associated with a user engagement with the one or more product solutions after providing the recommendation, and adjusting, using the machine learning engine, the recommendation parameters based on the feedback.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

FIG. 4 shows an illustrative flow chart depicting an example operation for identifying one or more product solutions for recommendation.

DETAILED DESCRIPTION

Implementations of the subject matter described in this disclosure include an apparatus to identify one or more plug-ins or applications to be recommended to a user. An apparatus is configured to transcribe, in real-time, a conversation between a user and an agent into speech text. The apparatus also processes the speech text during the conversation to generate an input to a recommendation engine, and the recommendation engine identifies one or more plug-ins or applications to recommend to the user. The agent then recommends (or determines not to recommend) one or more of the identified plug-ins or applications. In this manner, the agent is aided in identifying a plug-in or apparatus for recommendation, enhancing the support provided to the user during the interaction for supporting the user.

Implementations also include an apparatus to improve future recommendations through adjusting the recommendation engine based on feedback for previous recommendations. For example, the apparatus may receive feedback as to whether the user installs the recommended plug-in or application. If the recommendation engine includes a machine learning engine, the machine learning engine is trained based on the feedback of whether the user installs the recommended plug-in or application.

As used herein, a product refers to an application, software as a service (SaaS), infrastructure as a service (IaaS), platform as a service (PaaS), or other digital product offered by an entity to the user. As used herein, a product solution refers to a plug-in or application that integrates with the product.

A user may have questions or otherwise needs help with a product. For example, a user needing help in generating a specialized ledger in an accounting application may turn to the entity providing the accounting application. For example, the user calls a support center to speak with an agent. In another example, the user texts with an agent via an online chat, or the user interacts with an agent via other means. As used herein, interacting may refer to calling, texting, or other suitable interacting means. Also, as used herein, an agent may refer to a person or an automated support system (such as a bot to provide a predefined answer that best matches an interaction with a user). While the examples herein are directed to a user conversing with a live agent about an application, aspects of the disclosure also apply to other forms of products, interactions, and agents. As such, the examples are provided to describe aspects of the disclosure and are not intended to limit the disclosure outside of the scope of the claims.

Figure 1:
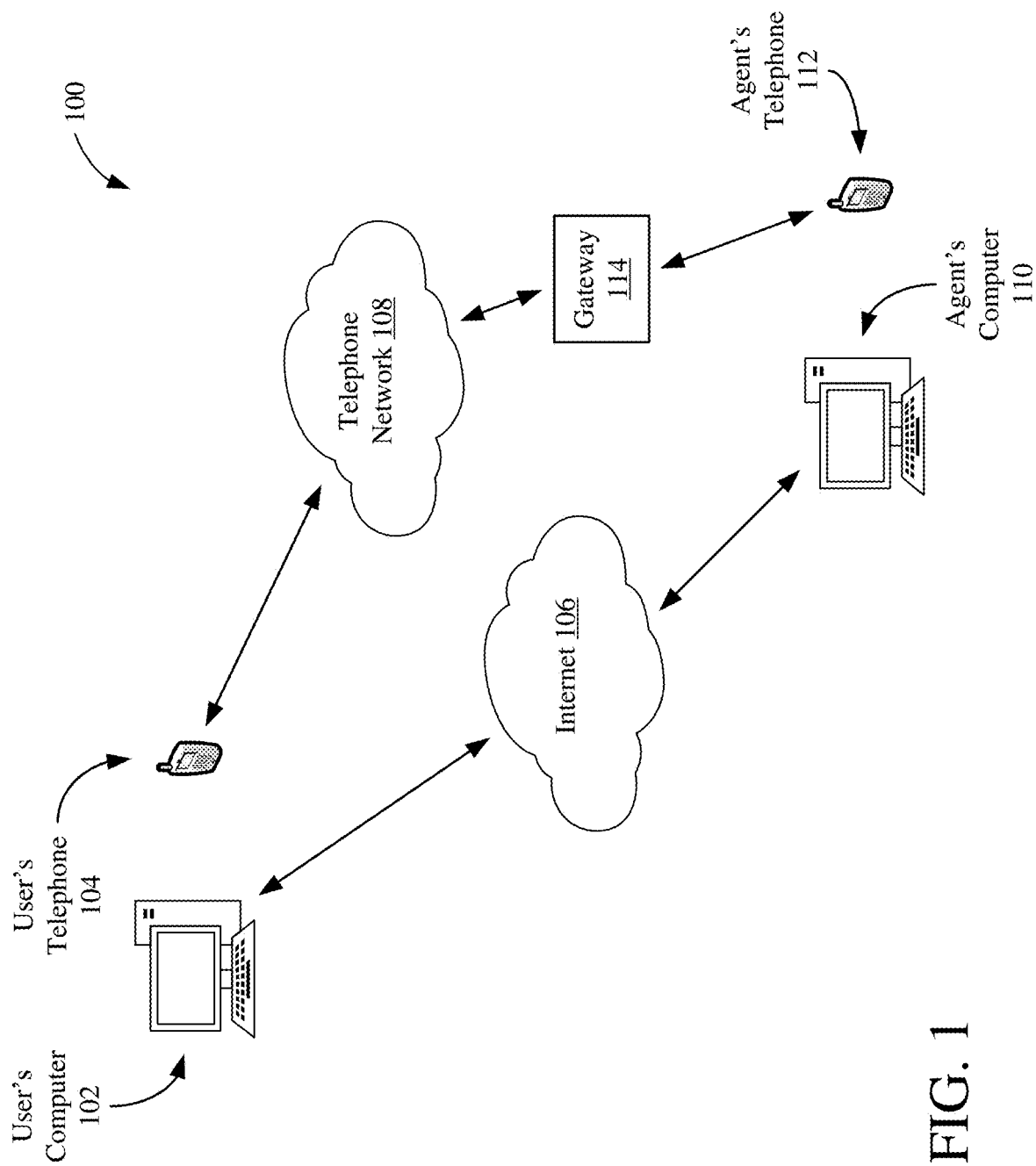
FIG. 1 shows a conventional user support system.

FIG. 1 shows a conventional user support system 100 for a user to interact with an agent. As illustrated, a user has a computer 102 and a telephone 104. The computer 102 is any suitable computing device for the user to use the product, such as a desktop, laptop, smartphone, tablet, and so on. For example, the computer 102 is a laptop including an accounting application that is installed or is run through a web browser. The telephone 104 is any suitable telephone, including a smartphone, a telephone connected to a plain old telephone service (POTS), a universal serial bus (USB) telephone coupled to the user's computer 102, a voice over internet protocol (VoIP) client running on the user's computer, and so on.

The agent uses a computer 110 (which is any suitable computing device) and a telephone 112 (which is any suitable telephone). In some implementations, the agent's telephone 112 is coupled to a gateway 114 that is configured to couple a customer support center's telephone lines (including the agent's telephone 112) to a telephone network 108 (such as a public switched telephone network (PSTN) or an integrated services digital network (ISDN)). In some implementations, both the user's computer 102 and the agent's computer 110 are coupled to the internet 106. If the user's telephone 104 or the agent's telephone 112 is configured for VoIP, voice data is sent through the internet 106. In this manner, the internet 106 may include the telephone network 108. In some other implementations, a third party converts VoIP packets from the internet to an analog signal transmitted via the telephone network 108 (such as a PSTN).

The user calls a customer support center including the agent, and the user's call from the user's telephone 104 is routed to the agent's telephone 112. The agent then uses the computer 110 (which can access knowledge local to the customer support center and from the internet) in assisting the user. The agent talks with the user for a limited amount of time, and based on the agent's experience, the agent determines whether to recommend a product solution to the user based on the call. For example, if an agent knows of an application plug-in that is directly related to the user's question, the agent may recommend the plug-in to the user.

While the agent's computer 110 may be able to access information about each product solution, the agent may not have time to search for product solutions other than those with which he or she is familiar. For example, an agent talking with a user for five minutes may have thirty seconds to review product solutions that for recommendation to the user. However, hundreds of product solutions may exist. Additionally, the agent may not immediately know a user's past experiences with different product solutions. Because of the limited amount of time and limited user data available to the agent, the agent may not identify a product solution to be recommended to the user.

In some implementations, an apparatus is configured to identify one or more product solutions for recommendation. In some implementations, the apparatus provides the recommendation to the agent to pass on during the conversation with the user. In some other implementations, the apparatus provides the recommendation directly to the user. The apparatus may also be configured to improve recommendations based on feedback for previous recommendations or additional user or agent data that affects recommendations.

Figure 2:
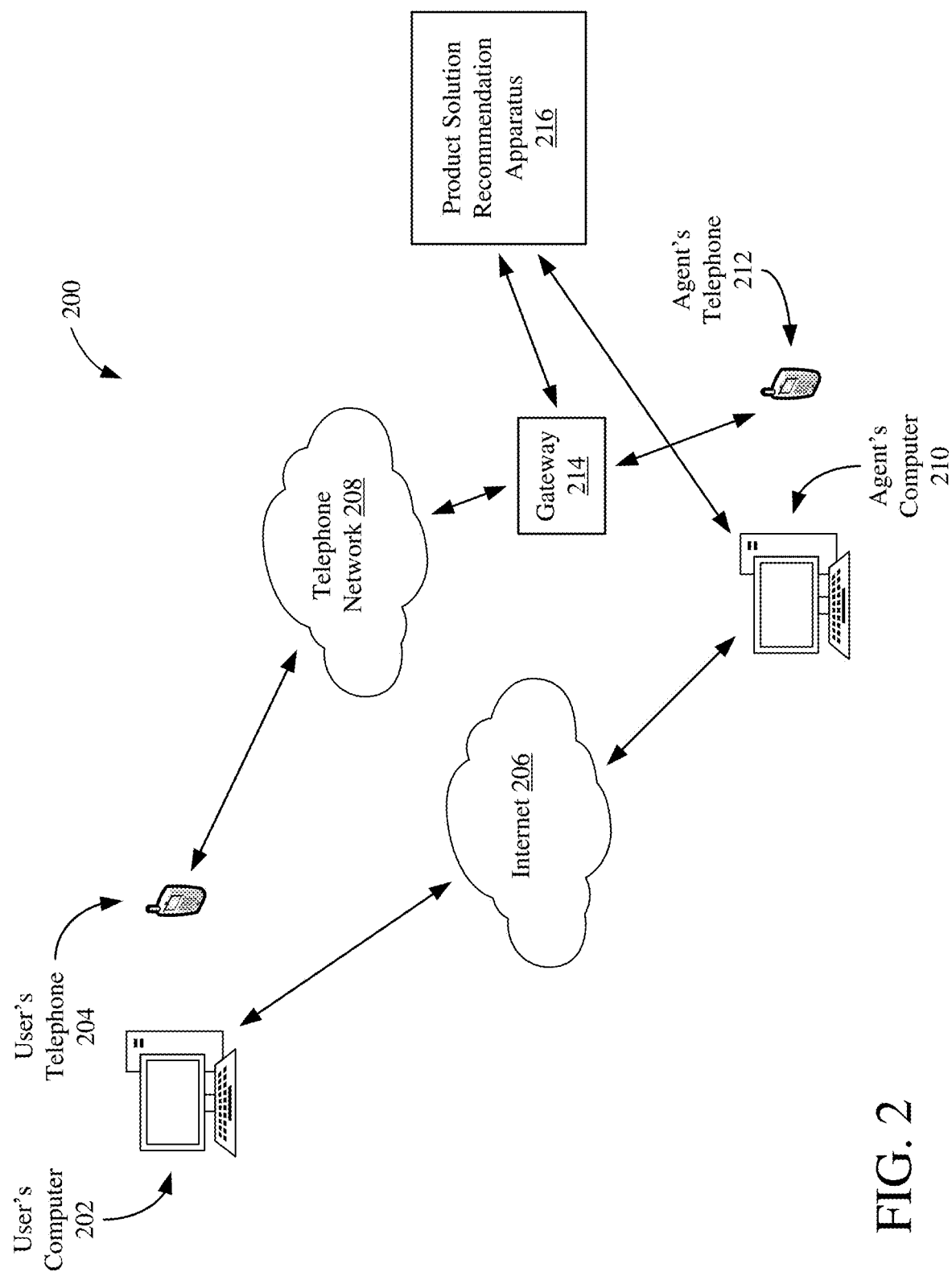
FIG. 2 shows an example user support system, according to some implementations.

FIG. 2 shows an example user support system 200, according to some implementations. The user uses a computer 202 and a telephone 204 (which may be similar to the computer 102 and the telephone 104, respectively), the agent uses a computer 210 and a telephone 212 (which may be similar to the computer 110 and the telephone 112, respectively), and the computers and telephones (including the gateway 214) are coupled to the internet 206 or a telephone network 208. The system 200 also includes a product solution recommendation apparatus 216 configured to identify one or more product solutions for recommendation. In some implementations, the apparatus 216 may be included in an agent's computer 210 (such as software executed by a processor of the computer 210). In some other implementations, the apparatus 216 may be included in a separate computing device (such as a server or networked computing device). In some further implementations, the apparatus 216 may be a program executed in a distributed environment (such as in a cloud computing environment or other distributed network). For example, the customer support center may be implemented as a web service solution (such as Amazon® Connect), and the product solution recommendation apparatus 216 may be coupled to the web service solution.

Figure 3:
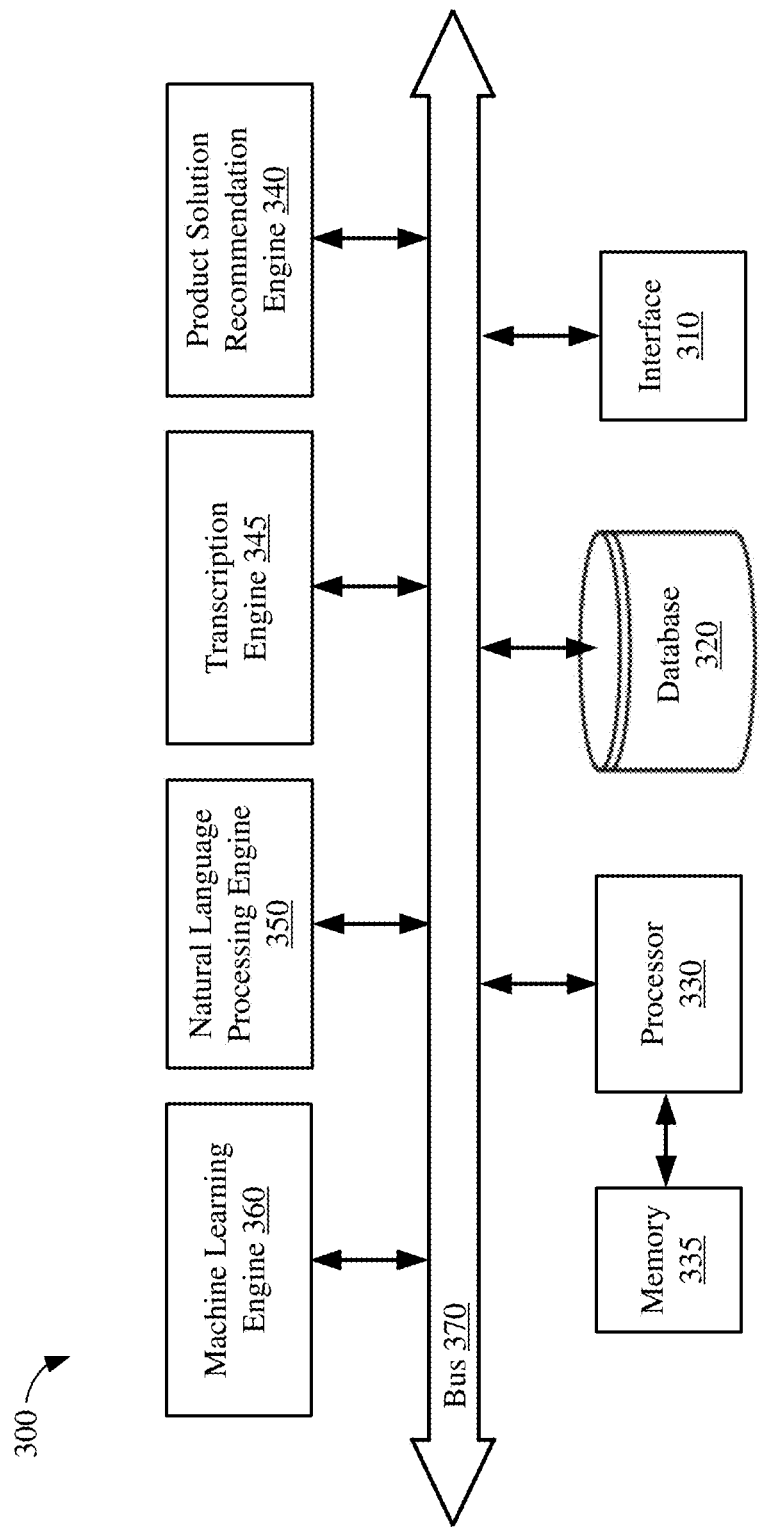
FIG. 3 shows an example product solution recommendation apparatus, according to some implementations.

FIG. 3 shows an example product solution recommendation apparatus 300, according to some implementations. The apparatus 300 is an example implementation of the product solution recommendation apparatus 216 in FIG. 2. The apparatus 300 is configured to analyze an interaction between a user and an agent and, based on the analysis and other optional inputs regarding the user, the agent, or the product solutions, identify one or more product solutions to be recommended.

In some implementations, the product solution recommendation apparatus 300 includes one or more interfaces 310, one or more databases 320, one or more processors 330 coupled to a memory 335, a product solution recommendation engine 340, a transcription engine 345, a natural language processing engine 350, and a machine learning engine 360. While the components 310-360 are illustrated as being coupled to one another via a bus 370, the components may be coupled in any suitable manner. For example, components may be coupled directly to one another, components may be distributed across multiple devices that are coupled to one another (such as via an intranet or the internet), or components may be interconnected using other suitable signal routing resources.

The interface 310 may be an input/output (I/O) interface. The interface 310 may include a screen, microphone and speakers, or a personal input device (such as a mouse, keyboard, joystick, and so on) for direct control by an agent or another person. Additionally or alternatively, the interface 310 includes a wired I/O interface (such as an ethernet connection, a fiber optic connection, a digital subscriber line (DSL) connection, a copper wire connection, a twisted pair connection, a universal serial bus (USB) connection, a parallel port, a serial port, a firewire port, and so on) and/or a wireless I/O interface (such as one or more antennas coupled to a Wi-Fi front end, a Bluetooth® front end, a cellular front end, and so on). The interface 310 may also include other suitable elements that allow information to be provided to the product solution recommendation apparatus 300 and for one or more recommendations to be provided by the apparatus 300.

In some implementations, the apparatus 300 is configured to receive, at the interface 310, a representation of the interaction between the user and the agent. For example, if the user is talking to the agent per phone, the interface 310 receives an analog signal of the conversation (such as from a PSTN), or the interface 310 receives a digital signal of the conversation (such as from an ISDN, a plurality of VoIP packets, a digital conversion or recording of the conversation, a recorded audio file, a video file, and so on). In some implementations, the apparatus 300 receives the conversation signal in real-time. As used herein, real-time refers to at the same time or close to the same time (such as during the conversation between the user and the agent). For example, receiving the audio signal in real-time may refer to the apparatus 300 receiving the signal at the same time or shortly after or before the agent's or user's telephone receives the signal. In this manner, the apparatus 300 is configured to identify one or more product solutions during the conversation between the user and the agent.

The apparatus 300 may be configured to convert/transcribe, in real-time, the audio data to speech text. For example, the transcription engine 345 transcribes the conversation between the user and the agent into a speech text while the conversation is occurring. As used herein, speech text refers to a text of the conversation between the user and the agent. The speech text is in a digital form for the apparatus 300 to process the speech text. In some implementations, the processor 330 or the transcription engine 345 may use a speech-to-text application to convert speech (from the conversation) to text in a digital form. For example, if the customer support center is implemented using Amazon® Connect, audio may be converted to speech text (in a digital data form) using Amazon® Transcribe or any other suitable transcription solution. In some other implementations, the apparatus 300 may receive, via the interface 310, the digital data of the speech text (such as after transcription).

The interface 310 is also configured to receive other inputs for identifying one or more product solutions for recommendation or for adjusting recommendation parameters used to identify one or more product solutions. The inputs may include a feedback associated with a user engagement with one or more product solutions previously recommended, a user location, information about a product solution previously engaged by the user, information about a product solution previously recommended to the user, information about product solutions not engaged by the user that were previously recommended to the user, metadata from a user application or product solution previously engaged by the user, a category of business for the user, agent input associated with an interaction between the agent and the user, input by one or more agents associated with a previous interaction with the user, previous transcripts, text, audio or other suitable recordings of interactions between one or more agents and the user, or any other suitable input.

As used herein, a user engagement with a product solution refers to the user downloading the product solution, the user using the product solution, the user installing the product solution, the user buying, renting, or otherwise paying for the product solution, the user querying the product for information regarding the product solution, the user discussing the product solution with the agent, or any other suitable action by the user associated with the product solution. In some implementations, feedback associated with a user engagement includes whether the product solution was installed by the user after the conversation with the agent during which the agent recommended the product solution. For example, if the product is an accounting application, a plug-in may exist to generate invoices for different tax districts and handle basic accounting tasks associated with the different tax districts. If the user interacts with the agent about a topic associated with invoice generation, the apparatus 300 may identify the plug-in as to be recommended based on the interaction between the user and the agent (and optionally additional inputs such as previous interactions and so on), and the agent recommends the plug-in to the user. In this manner, feedback includes information from the application as to whether the plug-in was installed by the user within an amount of time after the conversation with the agent.

Regarding a user location, some geographic locations may be more associated with some product solutions than other product solutions. For example, user interactions close to April 15 each year for users in the United States may correspond more to tax preparation solutions than user interactions for users outside the United States. In another example, a medical business park may be directed to business for medical research or services, and the location may therefore correspond more to medical associated product solutions. In some implementations, the user location may be provided by a user profile (such as an agent opening the user's profile during the interaction), the user location may be provided by the user's computer (such as an internet protocol (IP) based location when logged into a service), the user location may be based on the telephone number from which the user calls the agent, the user location may be based on the source IP address of packets from the user's computer or telephone, or the user location may be determined from any other suitable user information.

In some implementations, each product solution of the plurality of product solutions includes a description, one or more reviews, or other available information about the product solution. For example, a list of the product solutions includes an abstract or brief description for each product solution. The list may be available for the user or agent to search. Information from the abstracts may also be an input to the apparatus 300 in identifying one or more product solutions (from the list of product solutions) to be recommended to the user. Information about a product solution may include such information from the abstracts. Information about a product solution previously interacted with by the user may also include, for example, when the product solution was installed (or otherwise interacted with), any feedback from the user regarding his or her interaction with the product solution (such as a review, discussion with an agent, amount of time the product solution was used or installed, and so on), or other information about the product solution.

Information about a product solution previously recommended to the user may include a list of product solutions previously recommended, whether the product solutions were engaged with by the user, abstract information for the product solutions previous recommended, and so on. In some implementations, if a product solution was recently recommended to the user, the agent does not wish to recommend the same product solution. In this manner, the apparatus 300 may reduce the likelihood that the product solution is to be identified for recommendation. Similarly, information about product solutions not engaged by the user that were previously recommended to the user may include the list of product solutions recommended but not engaged. The apparatus 300 may reduce the likelihood that the previously recommended product solution is to be identified for recommendation.

Application or product solution metadata includes information (volunteered or approved by the user) to assist in identifying recommendations and improving the identification of recommendations. In some implementations, an application or a product solution generates a report summarizing operations of the application or the product (such as errors occurring, issues or other feedback input by a user, operating health of the product solution or the application, and so on). The user may consent to such reports being provided by the user's computer to the apparatus 300.

Business categories may be more associated with some product solutions than other product solutions. For example, a tax preparation service may be more associated with product solutions configured to handle accounting functions (such as payroll, tax withholding, invoicing, and so on) and product solutions configured to handle tax preparation functions (such as tax form generation and so on) than product solutions outside of financial services (such as draftsman assistant plug-ins for drawings or blueprints, presentation figures generation solutions, and so on). In the example, the apparatus 300 is configured to emphasize recommending financial services product solutions over other product solutions.

Agent input associated with a user interaction may include any text, audio, or other input provided by the agent during the user interaction or otherwise associated with the user interaction. For example, if the agent determines that the user has called previously for a similar topic, or the agent determines a topic of the conversation with the user, the agent can type notes about the topic associated with the current conversation. The agent alternatively may make audible comments or otherwise provide input that is received by the apparatus 300. Other types of agent input may be input from agents previously interacting with the user. Further types of agent input includes reviews or input corresponding to specific product solutions. For example, an agent may indicate whether the agent would likely or not likely recommend a specific product solution in the future. The agent may also provide input (such as notes) regarding the receptiveness of the user during the interaction or during or after providing a recommendation to the user.

The database 320 is configured to store any suitable information pertaining to identifying product solutions for recommendation or improving the identification of product solutions for recommendation. In some implementations, the database 320 stores the inputs from the interface 310. The database 320 may also store information about the product solutions. In some implementations, the information about the product solutions is a library of product solutions. The library of product solutions may be any suitable index of the product solutions. The library may link product solutions to topics or keywords, the library may include descriptions for each product solution, the library may include a user or agent rating of each product solution, the library may include information about the product solution designer, information about updates and support, or any other suitable information about each product solution. For example, the library may include a list of abstracts, with each product solution associated with an abstract. The database 320 may further store one or more recommendation parameters used by the apparatus 300 to identify one or more product solutions for recommendation. In some implementations, the database 320 may also store user information, specific product information, or any other suitable information. In some implementations, the database 320 is a relational database capable of presenting the data sets to a person (such as an agent) in tabular form and capable of manipulating the data sets using relational operators. In some aspects, the database 320 uses Structured Query Language (SQL) for querying and maintaining the database 320.

The one or more processors 330, which may be used for general data processing operations (such as manipulating data sets stored in the database 320), are one or more suitable processors capable of executing scripts or instructions of one or more software programs. In some implementations, the instructions are stored in the apparatus 300 (such as in the memory 335). In some other implementations, the instructions are distributed across multiple memories or otherwise stored outside of the apparatus 300. The one or more processors 330 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. In one or more implementations, the one or more processors 330 may be implemented as a combination of computing devices (such as a combination of a DSP and a microprocessor, a plurality of microprocessors, one or more microprocessors in conjunction with a DSP core, or any other such configuration).

The memory 335, which may be any suitable persistent memory (such as non-volatile memory) may store any number of software programs, executable instructions, machine code, algorithms, and the like that can be executed by the one or more processors 330 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

As noted above, the interface 310 may receive speech text (which may be a transcript of an interaction between the user and the agent), or the interface 310 may receive a representation of an audio or video conversation between the user and the agent (such as an analog signal of the audio, VoIP packets, digital signal of the audio, and so on).

As noted above, the apparatus 300 may include a transcription engine 345 that is configured to convert audio to a speech text. If the interface 310 receives the representation of the audio conversation, the apparatus 300 uses the transcription engine 345 to transcribe the conversation into a speech text. For example, the transcription engine 345 includes any suitable speech-to-text functionality used to convert the audio conversation. In some other implementations, the apparatus 300 may not include a transcription engine 345. For example, if the interface 310 does not receive audio (such as the interface only receiving transcripts after conversion), the apparatus 300 may not perform audio conversion to speech text.

The NLP engine 350 is configured to process the digital data of the speech texts (which may be received by the interface 310 or generated by the transcription engine 345). In some implementations, the apparatus 300 uses the NLP engine 350 to parse the speech text into one or more words. For example, the apparatus 300 identifies words, terms, or phrases (which include multiple words) in the speech text. The apparatus 300 may also use the NLP engine 350 to determine collocation information among the one or more words in the speech text. For example, the apparatus 300 determines distances between words or phrases. The NLP engine 350 may include instructions for processing the speech text according to one or more NLP models. In some implementations of the NLP models, the NLP engine 350 is configured to use word embedding to convert words and collocations of words in the speech text to vectors of real numbers. In this manner, the apparatus 300, using the NLP engine 350, may turn the words and collocations into features for use in identifying one or more product solutions for recommendation. For example, if a model is used to identify one or more product solutions for recommendation, the features (which may include vectors of real numbers) are inputs to the model.

An example word embedding NLP model is an n-gram model to generate n-grams (in natural language processing). In some implementations, an n-gram model may be used to determine frequency and probabilities of words or phrases in speech text based on the generated n-grams. Collocation information between words may also be used to determine probabilities of upcoming words in the speech text. An example n-gram model includes a bag-of-words model that may be used in processing the digital data of the speech text. Using the bag-of-words model, the apparatus 300 builds a library of words (or phrases) in the speech text and determines the frequency of specific words from the library in the speech text. The frequency of certain words may be used by the apparatus 300 to determine one or more topics of the interaction between the user and the agent. A topic, as used herein, may refer to an issue or other matter that is the reason for the user interacting/conversing with the agent or is otherwise causing the agent to focus attention during the interaction. For example, if the user calls regarding a question for invoice generation, a topic may correspond to invoicing.

Another example word embedding NLP model is a word vector model (which may also be referred to as a vector space model or a term vector model). For example, a vector of possible words (such as the words in a library for the speech text) includes a number of slots, with each slot in the word vector corresponding to a word occurring in a portion of the speech text. The word vector may be on a per sentence basis, on a fixed number of word basis, or any other suitable unit of the speech text. The value in the slots may be the frequency of the specific word (or phrase) in the unit of speech text. In some implementations, all words (or phrases) in the speech text may be included in the bag-of-words model or the word vector model.

In some other implementations, the apparatus 300 may separate common words from uncommon words. As used herein, common words refers to words without focus toward a specific topic. Example common words may include state of being verbs (such as is, are, am, and so on), pronouns (such as it, his, her, I, and so on), articles (such as a, an, the, and so on), conjunction terms (such as and, or, but, and so on), or other suitable words that may not assist in determining a topic or providing other information in identifying one or more product solutions for recommendation. As used herein, uncommon words refers to the remaining words after the common words are removed (such as proper nouns, terms referring to calendar dates, and so on).

In some further implementations, the apparatus 300 may separate keywords from other words in processing the speech text. For example, the apparatus 300 may use a library of keywords associated with topics to match against each word in the speech text. In this manner, the apparatus 300 may identify keywords in the speech text, and the apparatus 300 may identify one or more topics based on the identified keywords. For example, "accounting" may be a keyword in a library of keywords associated with a financial service topic. The apparatus 300 identifying the term "accounting" multiple times in the speech text may determine that a financial services topic is to be input to a recommendation engine 340.

In some implementations of word embedding, synonyms or words having similar meanings may be grouped. In this manner, a dictionary of words occurring in the speech text may be reduced (which may reduce vector sizes), and the frequency of similar words may be counted. For example, the words or phrases "good," "excellent," "great," "extremely satisfied," and so on may be grouped together and counted as a similar term. In this manner, the frequency of the terms may be determined as one value, and collocation information may be based on an appearance of any of the similar terms in the group. While word embedding may group similar meaning terms for processing in some implementations of the NLP engine 350, word embedding may treat terms as separate and independent of their meaning in some other implementations. In some implementations, the NLP engine 350 may be configured to provide keywords and word embeddings as inputs to the product solution recommendation engine 340. The inputs are then used by the product solution recommendation engine 340 to identify one or more product solutions for recommendation.

In some further implementations, the NLP engine 350 (such as using word embedding), is configured to process abstracts of the product solutions (such as from the library of product solutions) or other text to generate one or more words and collocation information. For example, the apparatus 300 processes each abstract to generate keywords associated with the product solution, word vectors corresponding to the abstract, or any suitable collocation information for the abstract. The information (such as the one or more words, word vectors, collocation information, and so on) may be provided as input to the product solution recommendation engine 340.

While some example NLP models are disclosed, any suitable NLP model may be used to process the speech text during the conversation between the user and the agent (or other text). Also, any number of NLP models may be used to generate any number of data sets or inputs (such as features) for a product solution recommendation engine 340. In some implementations, the product solution recommendation engine 340 is configured to identify one or more product solutions for recommendation to the user based on the inputs (such as the one or more words and the collocation information from the speech text and any other suitable inputs). For example, the apparatus 300 uses the product solution recommendation engine 340 to identify multiple product solutions and generate a ranked list of the product solutions for possible recommendation to the user. If the ranked list includes multiple product solutions, the highest ranked product solution may be based on a generated probability of the user to engage with the product solution after a recommendation.

The recommendation engine 340 includes recommendation parameters for generating one or more product solutions to be recommended to the user. In some implementations, the recommendation parameters include a propensity to engage model. The propensity to engage model may be used to determine a probability that a product solution is to be engaged with by the user after the agent interaction. For example, the apparatus 300, using the propensity to engage model, determines a probability that the user installs a plug-in or application after being recommended during the user and agent interaction. The propensity to engage model may also be used to determine a probability that an identified product solution for recommendation is actually recommended by the agent during the interaction. The probability may be based on whether the agent or another agent during similar user interactions in the past recommended the product solution.

Any number of factors may be used for the propensity to engage model. For example, any number of the above noted inputs, user profile information, agent profile information, or other suitable factors may be inputs into the propensity to engage model, and the apparatus 300 (using the propensity to engage model and the inputs) determines one or more product solutions with the highest probability of engagement by the user or the highest probability of recommendation by the agent. In one example, word embeddings and keywords from processing the speech text are input into the propensity to engage model.

The recommendation parameters (such as the propensity to engage model) may be any suitable means for identifying one or more product solutions for recommendation. In an example, the recommendation parameters include a hard decision tree where some inputs cause a probability of a product solution to be recommended to be zero. For example, if the agent previously indicated no interest in recommending a specific product solution, the product solution's probability of being recommended by the agent may be set to zero. In another example, if the user left a poor review or otherwise indicated dissatisfaction with a product solution, the product solution's probability of being recommended by the agent may be set to zero.

In addition or alternative to hard decisions, different inputs may lower or increase a probability associated with a product solution (such as a similar business category increasing the probability, previous interaction lowering the probability, previous recommendation to the same user lowering the probability, and so on). In some implementations, the propensity to engage model includes a vote sum model, a weighted average model, any suitable Bayesian probability model, or any suitable black box model.

An initial group of recommendation parameters (such as an initial propensity to engage model) may be defined at the start of the recommendation engine 340. For example, a programmer codes or installs an initial propensity to engage model. In some implementations, the initial model is based on comparing one or more words and collocation information from the speech text and one or more words and collocation information from each abstract of the product solutions in the library of product solutions. For example, one or more word vectors associated with the speech text may be compared to one or more word vectors associated with an abstract. A recommendation may be based on a distance between the word vectors (which may be associated with a probability of user engagement). The apparatus 300 may automatically adjust the recommendation parameters (such as the propensity to engage model) over time as feedback is received from use of the parameters or model. In some implementations, the apparatus 300, using the machine learning engine 360, adjusts the recommendation parameters based on feedback received from the user or the agent. For example, words in the word vectors may be emphasized or deemphasized in determining a distance, other factors may be included in determining a probability, and so on.

In generating the recommendation (such as identifying a product solution for recommendation), the recommendation engine 340 may be configured to rank a list of product solutions for recommendation. The ranking may be based on one or more probabilities associated with each product solution in the list. The probabilities, which may be determined by the recommendation engine 340, may include: a probability of the agent to suggest (or otherwise recommend) a product solution to the user after the ranked list or possible recommendation is provided to the agent; a probability of the agent to suggest (or otherwise recommend) a product solution to the user after the ranked list or possible recommendation is provided to the agent provided that the user has not previously engaged with the product solution;

a probability that the user engages with the product solution after recommendation; and a probability that the agent will suggest (or otherwise recommend) a product solution to the user and the user engages with the product solution after the ranked list or possible recommendation is provided to the agent. In some implementations, the apparatus 300 uses the one or more probabilities to determine a final probability associated with a product solution, and the list of one or more products solutions may be ranked based on the final probability. A final probability or ranking is determined in any suitable manner, such as a simple averaging of the determined probabilities for the product solution, a weighted averaging of the determined probabilities for the product solution, a median probability determination for the product solution, exclusion of outlier probabilities in grouping them for the product solution, and so on.

In providing one or more product solutions for recommendation, the apparatus 300 may provide the list of one or more product solutions to the agent. For example, the apparatus 300 may output the list of identified product solutions for possible recommendation to the agent's computer, and the agent's computer may display the list. The list may be organized in any suitable manner, such as in descending order of probability to engage (which may also be referred to as a final probability). The list may include any suitable information, such as an abstract of the product solution, to assist the agent in determining whether to recommend the product solution. The agent then determines whether to recommend one or more product solutions from the list. If the agent is a service bot (such as an automated chat client), the service bot may be configured to recommend the highest probability product solution identified.

In some other implementations, the apparatus 300 provides a recommendation of one or more product solutions directly to the user. If the product is an application on a user's computer, the apparatus 300 may provide a recommendation via a user application interface. For example, the application may include an in-product discovery (IPD) feature (such as a page or menu) for the user to learn about different product solutions for the application (such as plug-ins or other applications that may integrate with the application). If the apparatus 300 identifies one or more product solutions for recommendation to the user, the product solutions may be highlighted in the IPD feature of the application. For example, the application may notify the user on an IPD page that, based on an agent interaction, one or more product solutions may be beneficial to the user. Any other suitable means of providing the recommendation to the user may also be used, including other forms of communication acceptable to the user, such as electronic, mail, telephone, and so on. While the examples describe the agent providing the recommendation, aspects of the disclosure relate to either the apparatus 300 (such as via the product) or the agent providing the recommendation to the user.

After the apparatus 300 outputs a possible recommendation of one or more product solutions to the agent or the apparatus 300 outputs a recommendation of one or more product solutions to the user, the apparatus 300 receives feedback (via the interface 310) on the recommendation. For example, if the agent recommends a product solution that was identified by the apparatus 300, the agent may indicate such via his or her computer, and the indication is received at the apparatus 300. In another example, if a user engages with (such as installs) a product solution after being recommended, the product may provide an indication that the product solution was engaged (which is received at the apparatus 300). For example, a periodic summary of the product and installed (or otherwise engaged) product solutions may be provided from a user's computer, and the apparatus 300 may determine that the recommended product solution was installed based on the summaries In another example, the user may indicate in a future interaction with an agent that the product solution was engaged.

The machine learning engine 360 may include any number of machine learning models that can be used to adjust the recommendation engine 340. For example, if a product solution recommendation engine 340 is rule based for identifying one or more product solutions, the machine learning engine 360 is configured to adjust the rules (including inputs to the rules) based on the feedback received. For example, if the rules apply weightings to probabilities for recommending product solutions based on previous engagements of users with the product solution, and users continuously do not engage a product solution after recommendation, the machine learning engine 360 may decrease the weight for the product solution to lower its probability of being recommended. In another example, if only users in a specific geographic region do not engage the product solution, the machine learning engine 360 may adjust the rules to receive a user location as input in determining a probability for recommending the product solution.

In some implementations, the recommendation engine 340 includes a trainable model based on feedback. In this manner, machine learning may be included in the recommendation model for training purposes. As such, the recommendation engine 340 and the machine learning engine 360 may be a single engine. For example, the propensity to engage model may include a Latent Dirichlet allocation model, a random forest model, a classification and regression tree (CART), a neural network, or other suitable machine learning models that may be configured to provide a recommendation of one or more product solutions. In this manner, the apparatus 300 may provide the received feedback (with reference to the recommendation output by the model) to train or otherwise adjust the model to improve future recommendations.

In some implementations, a machine learning model can take the form of an extensible data structure that can be used to represent sets of words or phrases and/or can be used to represent sets of attributes or features for the product solutions. The machine learning models may be seeded with historical speech texts indicating the types of component structures and/or the types of attributes in previously generated models found to have accurately identified one or more product solutions for recommendation. In some implementations, the machine learning models store an accuracy score correlating keywords or other attributes to previous recommendations (which may be based on the user or agent feedback). The accuracy scores may be continually updated based on determinations that certain product solutions were subsequently found to be engaged by the user (or that certain product solutions were subsequently found to not be engaged by the user).

In some implementations of a combined recommendation and machine learning engine (which may be referred to herein as a machine learning engine), the comparisons performed by the engine to identify one or more product solutions for recommendation may be quantified, for example, based on a degree of similarity or correlation between previous speech texts, abstracts of the product solutions, user engagements with a product solution, or agent recommendation of the product solution and previous product solutions identified for recommendation. For example, a degree of similarity may be based on a distance between word vectors across user interactions, between word vectors for a user interaction and a product solution abstract, and so on. In another example, a degree of similarity may be based on an overlap of keywords between user interactions, between a user interaction and a product solution abstract, and so on. Such similarities may allow the apparatus 300 to rank or assign probabilities to a number of different product solutions from the library of product solutions for likelihood to be engaged or recommended.

The engines 340-360 may be implemented in hardware, software, or a combination of hardware and software. For example, the engines may be stored in code including instructions that are executed by one or more processors (such as processor 330 or a dedicated processor for the engine). In some implementations, the code for the engine may be stored in memory 335 or another memory in or outside the apparatus 300. As used herein, an engine being configured to perform an operation may refer to one or more processors (such as processor 330) executing instructions associated with the engine for performing the operation, an engine including hardware to perform the operation, or any other suitable architecture. The particular architecture of the apparatus 300 shown in FIG. 3 is to illustrate aspects of the disclosure, and is not intended to limit aspects of the disclosure to a particular architecture performing operations.

FIG. 4 shows an illustrative flow chart depicting an example operation 400 for identifying one or more product solutions for recommendation, according to some implementations. The example operation 400 is described below with respect to the product solution recommendation apparatus 300 of FIG. 3 for illustrative purposes only. It is to be understood that the example operation 400 may be performed by other suitable systems, computers, or servers.

At 402, the apparatus 300 transcribes, in real-time, a conversation between a user and an agent into a speech text. For example, the apparatus 300 receives the audio conversation (such as VoIP packets, an analog signal from a PSTN, a digital signal from an ISDN, and so on), and while the conversation is occurring, the apparatus 300 uses the transcription engine 345 to convert previous speech or the present speech of the conversation (such as the last sentence in the conversation or the current words in the conversation) into speech text.

At 404, the apparatus 300 uses the NLP engine 350 (such as one or more NLP models) to process digital data of the speech text associated with a topic. Processing the digital data may occur during the conversation so that recommendations may be provided in real-time or near real-time (such as during the interaction between the user and the agent). In some implementations, the apparatus 300 parses the speech text into one or more words (406). For example, signals at specific frequencies may be processed to determine patterns associated with a specific word or phrase. In this manner, words may be identified in the speech text. Additionally or alternatively, the apparatus 300 determines collocation information among the one or more words in the speech text (408). Collocation information may be determined based on distances between words, such as number of words apart in the speech text, amount of time between words, and so on. The collocation information may indicate relationships between words or terms. For example, if a topic is stated by the user during the conversation and the terms "excellent," "good," or similar are stated by the user within a specific number of words of the topic, collocation information may indicate a relationship between a positive user sentiment and the topic. In some implementations, the relationship becomes stronger as the distance between terms decreases.

Proceeding to 410, the apparatus 300 provides the one or more words and the collocation information as a first input set to a machine learning engine 360 configured to recommend one or more product solutions from a library of product solutions. As noted above, if a machine learning model is configured to recommend one or more product solutions based on a user/agent interaction (and optionally other input), the recommendation engine 340 and the machine learning engine 360 may be a single engine performing the operations of generating recommendations (such as identifying one or more product solutions for possible recommendation by an agent) and adjusting the model based on feedback for the recommendation.

In response to providing the one or more words and the collocation information as a first input set to a machine learning engine 360, the apparatus 300 generates a recommendation of one or more product solutions for a user (412). To generate the recommendation, the apparatus 300, using the machine learning engine 360, may process the first input set based on recommendation parameters for the library of product solutions (414). For example, the apparatus 300 may use a propensity to engage model (which may be any suitable machine learning model, rule-based model, and so on) to receive the first input set and generate a recommendation (such as a list of one or more product solutions to be output to the agent).

The apparatus 300 then provides the recommendation (416). In some implementations, the apparatus 300 provides the recommendation to the agent (418). For example, a ranked list of one or more product solutions may be surfaced to the agent (such as displayed on the agent's computer or otherwise provided to the agent), and the agent may determine whether to recommend one or more product solutions to the user. In some other implementations, if no suitable matches of a product solution are found in generating a recommendation, the apparatus 300 may not provide a recommendation to the agent, or the apparatus 300 may indicate that no suitable product solutions are identified. For example, if a probability to engage or recommend that is associated with each product solution is below a threshold, the apparatus 300 may indicate to the agent that no product solutions were identified for recommendation to the user.

In some other implementations of providing the recommendation, the apparatus 300 provides the recommendation to the user (418). For example, an application on the user's computer may obtain, from the apparatus 300, a list of one or more product solutions to be recommended to the user based on a user interaction with an agent. The user may then be notified by the application of the one or more product solutions (such as through an IPD feature). For example, the application may highlight or rearrange product solutions (such as plug-ins and information about the plug-ins) in an IPD section of the application.

The example operation 400 in FIG. 4 is an example means for the apparatus 300 to identify one or more product solutions for recommendation to assist the user or the agent. Transcription of the user/agent interaction, processing of the text speech, and identification of product solutions may be performed in near real-time. In this manner, the agent and user may be apprised of a suitable product solution from hundreds of product solutions of which the user or agent may not be aware. For example, a user may be apprised of a plug-in or other application to perform missing functions in the base application on the user's computer. In this manner, the apparatus 300 may enrich the user's experience.

Figure 5:
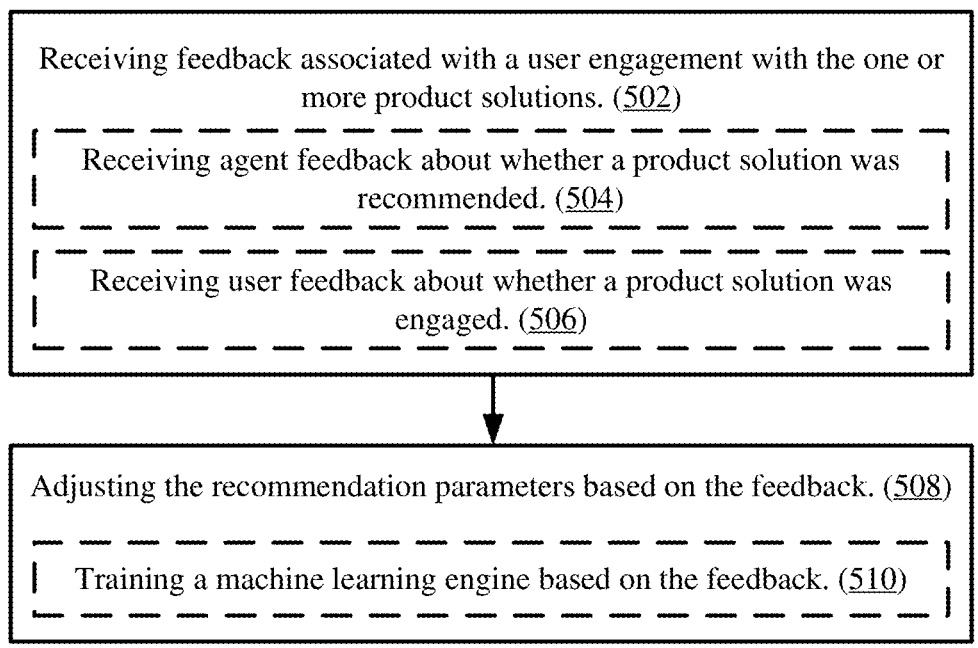
FIG. 5 shows an illustrative flow chart depicting an example operation for adjusting the recommendation apparatus based on feedback.

After providing the recommendation, the apparatus 300 may receive feedback and use the feedback to improve future recommendations. FIG. 5 shows an illustrative flow chart depicting an example operation 500 for adjusting the recommendation apparatus 300 based on feedback. The example operation 500 is described below with respect to the product solution recommendation apparatus 300 of FIG. 3 for illustrative purposes only. It is to be understood that the example operation 500 may be performed by other suitable systems, computers, or servers.

At 502, the apparatus 300 receives, via the interface 310, feedback associated with a user engagement with the one or more product solutions. If the recommendation was provided to the agent, the apparatus 300 may receive feedback from the agent (504). In some implementations, the apparatus 300 receives an indication from the agent as to whether a product solution from the recommendation was suggested or otherwise recommended to the user. For example, the agent may click on a product solution in a list displayed on the agent's computer to indicate that the product solution was recommended to the user. In another example, the user may input text, close the list, or perform other suitable actions to indicate whether a product solution was recommended to the user. The agent may also indicate if the recommendation received from the apparatus 300 is relevant or helpful. For example, the agent may determine that the one or more product solutions identified in the list or not suitable to be recommended to the user, and may indicate such as feedback to the apparatus 300.

In some implementations of receiving feedback, the apparatus 300 receives feedback from the user about whether a recommended product solution was engaged (506). For example, the apparatus 300 may receive an indication from the product that the product solution was or was not engaged (such as installed) after the recommendation. In another example, the apparatus 300 may receive text, a review, a rating, or other input corresponding to the product solution that is provided by the user. As noted, feedback may be any suitable information from the user or agent that can be used by the apparatus 300 to improve future recommendations (such as to train a machine learning recommendation model).

After receiving the feedback, the apparatus 300 adjusts the recommendation parameters based on the feedback (508). In some implementations, the apparatus 300 uses a machine learning engine 360 to update a propensity to engage model. For example, if the propensity to engage model includes one or more machine learning models, the input, the recommendation, and the feedback may be used to validate and test the existing machine learning models. If the existing models provide incorrect recommendations based on the inputs (such as recommendations indicated as not to be suggested to the user by the agent or indicated by the user as not including product solutions to be engaged), the apparatus 300 may adjust or train the models. For example, adjusting the model may include emphasizing or deemphasizing a keyword or collocation information in determining a probability to engage for one or more product solutions. In some implementations, adjusting the models may be performed recursively, using the previous input sets, recommendations, and feedback to validate recommendations from the models after adjustment. As noted above, other inputs may be used in generating a recommendation and in adjusting the recommendation models (such as a user location, previous product solutions engaged, and so on).

The example operation 500 in FIG. 5 is an example means for the apparatus 300 to improve future recommendations to improve user and agent interactions. In this manner, the agent and user may be apprised of better matching product solutions over time and enrich the user's experience.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on a computer-readable medium as one or more instructions or code. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other non-transitory medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray disc, and may reproduce data magnetically or optically. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of identifying one or more product solutions, the method performed by one or more processors of a computing device and comprising:
   transcribing, in real-time, a conversation between a user and an agent into a speech text;
   processing, during the conversation and using a natural language processing (NLP) model, digital data of the speech text associated with a topic, wherein processing the digital data of the speech text includes:
      parsing the speech text into one or more words; and
      determining collocation information among the one or more words in the speech text;
   providing the one or more words and the collocation information as a first input set to a machine learning engine configured to recommend one or more product solutions from a library of product solutions;
   generating a recommendation of one or more product solutions for a user, wherein generating the recommendation includes:
      processing, using the machine learning engine, the first input set based on recommendation parameters for the library of product solutions;
      determining, for each product solution in the recommendation, a probability of one from the group consisting of:
         the agent to suggest the product solution to the user after the recommendation;
         the agent to suggest the product solution to the user after the recommendation provided that the user has not previously engaged with the product solution;
         the user to engage with the product solution after the recommendation; and
         the agent to suggest the product solution to the user and the user to engage with the product solution after the recommendation; and
      ranking a list of product solutions based on the probabilities, wherein the recommendation includes the ranked list of product solutions; and
   providing the recommendation.

2. The method of claim 1, wherein processing the digital data of the speech text includes at least one from the group consisting of:
   converting the speech text to n-grams using the NLP model, wherein the n-grams are included in the first input set provided to the machine learning engine; and
   converting the speech text to word vectors using the NLP model, wherein the word vectors are included in the first input set provided to the machine learning engine.

3. The method of claim 1, further comprising:
   receiving feedback associated with a user engagement with the one or more product solutions after providing the recommendation; and
   adjusting, using the machine learning engine, the recommendation parameters based on the feedback.

4. The method of claim 3, wherein providing the recommendation includes providing the recommendation to the agent during the conversation, wherein the feedback includes at least one from the group consisting of:
   whether a product solution was suggested by the agent to the user based on the recommendation; and
   whether the user engaged with a product solution from the recommendation after receiving the recommendation.

5. The method of claim 1, further comprising providing a second input set to the machine learning engine, wherein:
   generating the recommendation further includes processing, using the machine learning engine, the second input set based on the recommendation parameters; and
   the second input set includes at least one from the group consisting of:
      a processed digital data of text of a previous user speech;
      a user location;
      product solutions previously engaged by the user;
      product solutions previously recommended;
      product solutions not engaged by the user after a previous recommendation;
      metadata from the user application or product solutions previously engaged by the user;
      an identified category of business for the user;
      an agent input associated with the interaction between the agent and the user;
      input by one or more agents associated with a previous interaction with the user; and
      a processed digital data of text of one or more agents' speech in interacting with the user.

6. The method of claim 1, wherein:
   the recommendation parameters includes at least one model from the group consisting of:
      a Latent Dirichlet allocation;
      a Random Forest; and
      a Neural Network; and
   adjusting the recommendation parameters includes adjusting the at least one model based on the received feedback.

7. A system for identifying one or more product solutions, comprising:
   one or more processors; and
   a memory storing instructions that, when executed by the one or more processors, causes the system to perform operations including:
      transcribing, in real-time, a conversation between a user and an agent into a speech text;
      processing, during the conversation and using a natural language processing (NLP) model, digital data of the speech text associated with a topic, wherein processing the digital data of the speech text includes:
         parsing the speech text into one or more words; and
         determining collocation information among the one or more words in the speech text;
      providing the one or more words and the collocation information as a first input set to a machine learning engine configured to recommend one or more product solutions from a library of product solutions;

generating a recommendation of one or more product solutions for a user, wherein generating the recommendation includes:
  processing, using the machine learning engine, the first input set based on recommendation parameters for the library of product solutions;
  determining, for each product solution in the recommendation, a probability of one from the group consisting of:
    the agent to suggest the product solution to the user after the recommendation;
    the agent to suggest the product solution to the user after the recommendation provided that the user has not previously engaged with the product solution;
    the user to engage with the product solution after the recommendation; and
    the agent to suggest the product solution to the user and the user to engage with the product solution after the recommendation; and
  ranking a list of product solutions based on the probabilities, wherein the recommendation includes the ranked list of product solutions; and
  providing the recommendation.

8. The system of claim 7, wherein operations for processing the digital data of the speech text includes at least one from the group consisting of:
  converting the speech text to n-grams using the NLP model, wherein the n-grams are included in the first input set provided to the machine learning engine; and
  converting the speech text to word vectors using the NLP model, wherein the word vectors are included in the first input set provided to the machine learning engine.

9. The system of claim 7, wherein operations further include:
  receiving feedback associated with a user engagement with the one or more product solutions after providing the recommendation; and
  adjusting, using the machine learning engine, the recommendation parameters based on the feedback.

10. The system of claim 9, wherein operations for providing the recommendation includes providing the recommendation to the agent during the conversation, wherein the feedback includes at least one from the group consisting of:
  whether a product solution was suggested by the agent to the user based on the recommendation; and
  whether the user engaged with a product solution from the recommendation after receiving the recommendation.

11. The system of claim 7, wherein the operations further include providing a second input set to the machine learning engine, wherein:
  operations for generating the recommendation further include processing, using the machine learning engine, the second input set based on the recommendation parameters; and
  the second input set includes at least one from the group consisting of:
    a processed digital data of text of a previous user speech;
    a user location;
    product solutions previously engaged by the user;
    product solutions previously recommended;
    product solutions not engaged by the user after a previous recommendation;
    metadata from the user application or product solutions previously engaged by the user;
    an identified category of business for the user;
    an agent input associated with the interaction between the agent and the user;
    input by one or more agents associated with a previous interaction with the user; and
    a processed digital data of text of one or more agents' speech in interacting with the user.

12. The system of claim 7, wherein:
  operations for generating the recommendation by the machine learning engine is based on at least one model from the group consisting of:
    a Latent Dirichlet allocation;
    a Random Forest; and
    a Neural Network; and
  operations for adjusting the recommendation parameters include adjusting the at least one model based on the received feedback.

13. A non-transitory computer-readable medium storing instructions that, when executed by one or more processors of an apparatus, cause the apparatus to identify one or more product solutions comprising:
  transcribing, in real-time, a conversation between a user and an agent into a speech text;
  processing, during the conversation and using a natural language processing (NLP) model, digital data of the speech text associated with a topic, wherein processing the digital data of the speech text includes:
    parsing the speech text into one or more words; and
    determining collocation information among the one or more words in the speech text;
  providing the one or more words and the collocation information as a first input set to a machine learning engine configured to recommend one or more product solutions from a library of product solutions;
  generating a recommendation of one or more product solutions for a user, wherein generating the recommendation includes:
    processing, using the machine learning engine, the first input set based on recommendation parameters for the library of product solutions;
    determining, for each product solution in the recommendation, a probability of one from the group consisting of:
      the agent to suggest the product solution to the user after the recommendation;
      the agent to suggest the product solution to the user after the recommendation provided that the user has not previously engaged with the product solution;
      the user to engage with the product solution after the recommendation; and
      the agent to suggest the product solution to the user and the user to engage with the product solution after the recommendation; and
    ranking a list of product solutions based on the probabilities, wherein the recommendation includes the ranked list of product solutions; and
  providing the recommendation.

14. The computer-readable medium of claim 13, wherein execution of the instructions for processing the digital data of the speech text causes the apparatus to perform at least one from the group consisting of:
  converting the speech text to n-grams using the NLP model, wherein the n-grams are included in the first input set provided to the machine learning engine; and
  converting the speech text to word vectors using the NLP model, wherein the word vectors are included in the first input set provided to the machine learning engine.

15. The computer-readable medium of claim 14, wherein execution of the instructions further causes the apparatus to:
  receive feedback associated with a user engagement with the one or more product solutions after providing the recommendation; and
  adjust, using the machine learning engine, the recommendation parameters based on the feedback.

16. The computer-readable medium of claim 15, wherein execution of the instructions for providing the recommendation causes the apparatus to provide the recommendation to the agent during the conversation, wherein the feedback includes at least one from the group consisting of:
  whether a product solution was suggested by the agent to the user based on the recommendation; and
  whether the user engaged with a product solution from the recommendation after receiving the recommendation.

17. The computer-readable medium of claim 13, wherein execution of the instructions further causes the apparatus to perform operations comprising providing a second input set to the machine learning engine, wherein:
  generating the recommendation further includes processing, using the machine learning engine, the second input set based on the recommendation parameters; and
  the second input set includes at least one from the group consisting of:
    a processed digital data of text of a previous user speech;
    a user location;
    product solutions previously engaged by the user;
    product solutions previously recommended;
    product solutions not engaged by the user after a previous recommendation;
    metadata from the user application or product solutions previously engaged by the user;
    an identified category of business for the user;
    an agent input associated with the interaction between the agent and the user;
    input by one or more agents associated with a previous interaction with the user; and
    a processed digital data of text of one or more agents' speech in interacting with the user.

* * * * *